US006769531B1

(12) United States Patent
Ursitti

(10) Patent No.: US 6,769,531 B1
(45) Date of Patent: Aug. 3, 2004

(54) PUSHER DOG ASSEMBLY

(75) Inventor: Richard G. Ursitti, Pasadena, CA (US)

(73) Assignee: SDI Industries, Inc., Pacoima, CA (US)

(*) Notice: Subject to any disclaimer, the term of this patent is extended or adjusted under 35 U.S.C. 154(b) by 0 days.

(21) Appl. No.: 10/385,085

(22) Filed: Mar. 10, 2003

(51) Int. Cl.[7] ............................................. B65G 19/22
(52) U.S. Cl. ...................... 198/727; 198/728; 198/734; 104/172.4
(58) Field of Search .................................. 198/717, 721, 198/727, 728, 732, 733, 734, 465.4, 678.1; 104/172.2, 172.4

(56) References Cited

U.S. PATENT DOCUMENTS 2,946,427 A * 7/1960 Friedman .................... 198/729
4,537,301 A * 8/1985 Bavelloni .................... 198/732
4,585,116 A * 4/1986 Albrecht ...................... 198/729
4,635,558 A * 1/1987 Hoehn ....................... 104/172.4
6,367,612 B1 * 4/2002 Dosso et al. ............. 198/465.4

* cited by examiner

Primary Examiner—James R. Bidwell
(74) Attorney, Agent, or Firm—Pillsbury Winthrop LLP

(57) ABSTRACT

A pusher dog assembly is provided for the transportation of products on hangers in a conveyer system. The pusher dog assembly may be designed to directly engage hangers on a series of interconnected rails. A system for transporting products on hangers is also provided. The system may include a series of interconnected rails, an enclosed track, a chain and a pusher dog assembly. The chain may be disposed within the enclosed track, which may, in turn, be disposed parallel to, and above, the series of interconnected rails. The pusher dog may be engaged to the chain and may be designed to directly engage hangers and push them along the series of interconnected rails.

2 Claims, 5 Drawing Sheets

US 6,769,531 B1

PUSHER DOG ASSEMBLY

FIELD OF THE INVENTION

The present invention relates to overhead conveyer systems for the movement of hanging products. In particular, the invention relates to pusher dog assemblies designed for the transportation of hanging products in an overhead conveyer system.

BACKGROUND OF THE INVENTION

Overhead conveyer systems are well known in the present state of the art. The systems are used for transporting various types of merchandise, including hanging garments and other products, through manufacturing, warehousing and distribution facilities. Typical overhead conveyer systems are "power and free" systems that push heavy, metal trolleys along a track system. The trolleys carry loads of products, such as garments on hangers ("GOH").

Power and free conveyer systems employ a system of two, parallel tracks; an upper power track and a lower free track are incorporated. The upper track generally includes a drive chain that engages a component of the trolley, while the trolley's wheels are designed to ride within the free track. The load supported by the trolley (e.g., GOH) is most often suspended below the level of the free track. The drive chain commonly includes a pusher dog that extends downward from the drive chain and engages a part of the trolley that protrudes above the level of the free track. A pusher dog is, generally, a projection that engages and pushes loads along a track or conveyer system. Movement of the trolley is thus accomplished by the mechanized action of the pusher dog on the protruding trolley part There are many instances of power and free conveyer systems in the present state of the art, including several references to pusher dogs. U.S. Pat. No. 6,367,612 to Dosso et al., U.S. Pat. No. 6,308,637 to Sheets et al. and U.S. Pat. No. 4,981,081 to Summa are examples. All of these patents are directed to pusher dog variants that are designed to accomplish the movement of the aforementioned trolleys in a power and free conveyer system. However, references to pusher dogs or to conveyer systems that are adapted for operation without the use of trolleys are significantly less common. Some pusher dogs have been manufactured that were intended for use in conveyer systems that do not incorporate trolleys. Those pusher dogs were intended for use in conveyer systems wherein the pusher dogs were suspended from an upper rail or chain and were designed to engage hangers suspended on a series of interconnected rails disposed below the upper rail or chain. Those prior pusher dogs encountered several problems, including an unmanageable amount of friction between the pusher dogs and the series of interconnected rails, and difficulty in pushing hangers up inclined sections of the series of interconnected rails. In addition, prior pusher dogs were not reliably secured to the upper rail or chain. Under such, circumstances, the pusher dogs could not be maintained at a constant height above the series of interconnected rails and, thus, the aforementioned problem regarding friction between the pusher dogs and the series of interconnected rails was exacerbated.

Power and free overhead conveyer systems are often used in conjunction with high speed hanging garment sorters in the processing of GOH. In such an arrangement, GOH may be uploaded into a power and free system in the receiving area of a warehousing or distribution facility. The power and free system may then be used to transport single units or batches of GOH to the induction stations of the high speed garment sorters in a particular sequence or pattern. The high speed sorters are then used to separate the units or batches of GOH according to criteria such as size, style, color or shipment destination.

The use of power and free overhead conveyer systems that incorporate garment trolleys to move GOH has several disadvantages. High speed garment sorters have a potential throughput of at least 12,000 units per hour. Power and free systems cannot deliver GOH at a matching rate. The pusher dogs of power and free systems arc not designed to directly engage hangers on a system of tracks or rails. Instead, power and free pusher dogs engage trolleys that are, in turn, carrying loads of GOH. As a result, while power and free systems may be able transport up to 200 garments per minute past a given point, the garment trolleys must be manually offloaded before the GOH can be transferred to the high speed sorters, thus reducing the delivery rate drastically. Therefore, the use of power and free conveyer systems in conjunction with high speed sorters effectively starves the sorters and forces them to run below capacity. This represents an inefficient use of resources and reduces the overall productivity of facilities.

The garment trolleys themselves also present various difficulties. Trolleys represent an added expense for any facility, both in purchase and maintenance costs. Also, conveyer systems incorporating trolleys can be noisy to operate. Further, additional costs are often incurred by users of power and free systems since they must also install a return system for empty trolleys (i.e., so that the trolleys can be conveyed to their starting position once the garments have been manually transferred from the trolleys to the high speed sorters). Finally, the above-mentioned manual offload of garment trolleys from power and free systems is physically demanding and can result in personal injury. The low efficiency of power and free systems and the physically demanding aspect of their use results in high labor costs.

The existing art is therefore not sufficient for the task of moving large volumes of GOH or other products in a cost-effective and efficient manner. A suitable pusher dog for a high capacity conveyer system that does not incorporate trolleys is desired.

BRIEF DESCRIPTION OF THE DRAWINGS

FIG. 1a is a side perspective view thereof. FIG. 1b is a side perspective view of a pusher dog pad.

FIG. 2a is a side perspective, cut-away view of an interior of an enclosed track. A power chain and pusher dog assemblies are shown. FIG. 2b is another side perspective view of the enclosed track. Brackets and support elements are depicted, along with a rail component and lower portions of pusher dog assemblies. FIG. 2c is a cross-sectional view of the enclosed track and rail component. A pusher dog assembly is shown.

DETAILED DESCRIPTION

Figure 1A:
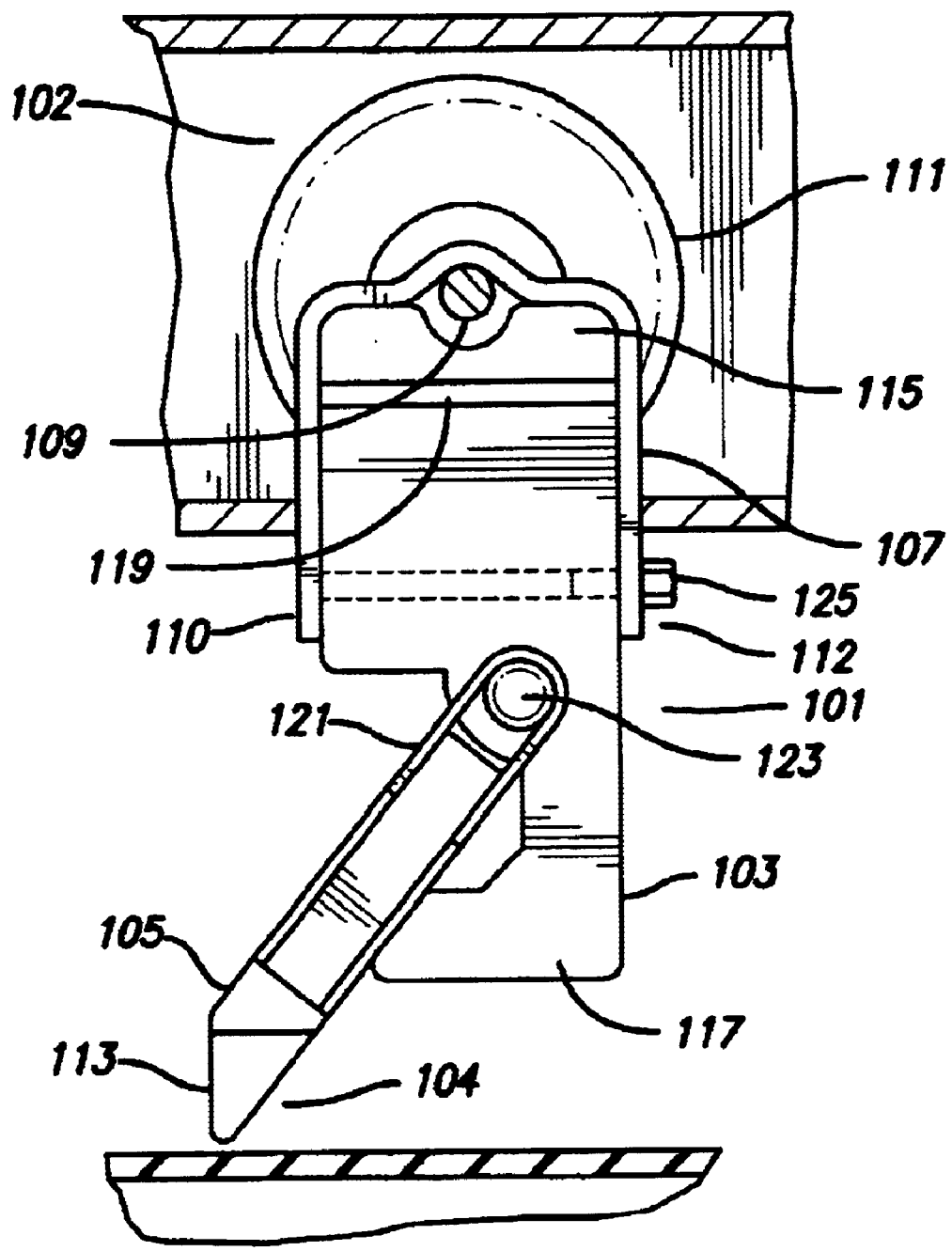
FIGS. 1a–b illustrate a pusher dog assembly in accordance with an embodiment of the present invention.

It has been discovered that the processing of GOH or other products on hangers can best be accomplished through the use of pusher dog assemblies adapted for use in a trolley-less overhead conveyer system. A trolley-less overhead conveyer system in accordance with the present invention may include a series of interconnected rails or rail components whose length and contour may be adapted to the requirements of the facility where they are to be installed. The series of interconnected rails or rail components may have a top and a bottom and may include an elongated member or metal extrusion and a plastic member or extrusion that is designed to fit over the elongated member or metal extrusion. The series of interconnected rails or rail components may be designed such that hangers may be suspended on the top thereof.

The trolley-less overhead conveyer system may also include an enclosed track, running parallel to and above the series of interconnected rails or rail components, which may house a movable train or power chain. The movable train or power chain may be mounted with pusher dog assemblies that extend downward from the movable train or power chain, towards the series of interconnected rails or rail components. The pusher dog assemblies may be designed to directly engage hangers and transport them along the series of interconnected rails or rail components. Track switches that provide for the transfer of GOH or other products on hangers onto, or off of, the series of interconnected rails or rail components may also be included. The track switches may also incorporate flexible switch arms, designed to facilitate the movement of components of the track switches. Finally, hook assemblies that mediate the transfer of GOH or other products on hangers from the trolley-less overhead conveyer system to further processing steps may also be included.

The various components of a trolley-less overhead conveyer system in accordance with the present invention may be suspended above a facility floor, using brackets and support members, at a height that allows GOH or other products on hangers to hang freely from the series of interconnected rails or rail components and that provides operators with easy access. GOH or other products on hangers may be inducted into the system at track switches and then may be conveyed along the series of interconnected rails or rail components by the pusher dog assemblies. At another track switch, GOH or other products on hangers may then be transferred to a hook assembly, where conveyer hooks pick up GOH or other products on hangers and mediate induction into high speed hanging garment sorters. Track switches and hook assemblies may be positioned outside the parallel course of the series of interconnected rails or rail components and enclosed track.

As discussed in more detail below, various different materials and component designs may be suitable for use in association with the present invention. Materials may be chosen and components may be designed to achieve the goal of seamlessly moving GOH or other products on hangers quickly, efficiently, and cost-effectively through various processing steps. Various embodiments of the present invention may be used in garment manufacturing, warehousing and distribution operations. For example, one embodiment may be used in a garment distribution facility to deliver large quantities of GOH to high speed hanging garment sorters. In such an installation, GOH may be inducted into a trolley-less overhead conveyer system at a track switch in a receiving area, it may then be conveyed along a series of interconnected rails or rail components by pusher dog assemblies in accordance with the present invention, it may then be delivered to a hook assembly at another track switch and it then may be inducted into a high speed hanging garment sorter. The high speed sorter may then separate the GOH by, inter alia, shipment destination and may deliver the GOH to suitable sections of a shipping area. One skilled in the art will realize that the trolley-less overhead conveyer system of the present invention may be equally easily adapted to a manufacturing or a warehousing facility, or any other facility for the processing of GOH or other products on hangers.

The trolley-less overhead conveyer system of the present invention may accomplish the movement of GOH without encountering the difficulties of other known overhead conveyer systems. Specifically, the trolley-less system may operate at a capacity (in terms of garments/minute moved past a given point) that more closely matches the capacity of high speed hanging garment sorters, thus preventing the sorters from getting starved and increasing overall facility throughput. A trolley-less overhead conveyer system in accordance with the present invention may transport GOH at a rate of 500 garments per minute past a given point, thus ensuring a constant feed of garments to high speed sorters that operate at a capacity of 12,000 units per hour or more. Thus, the system of the present invention may use resources (such as high speed sorters) more efficiently and may increase the productivity of facilities.

Furthermore, the system of the present invention operates without garment trolleys, thus solving many of the problems presented by known power and free overhead conveyer systems. The system does not require manual offload of trolleys from a conveyer system or manual transfer of GOH from the conveyer system to high speed hanging garment sorters (as required by power and free systems). Instead, pusher dog assemblies in accordance with the present invention directly engage hangers and transport them along the series of interconnected rails or rail components. In addition, seamless operational transfer from the trolley-less overhead conveyer system to the high speed sorters may be provided through the use of the hook assemblies. The direct engagement of hangers and the seamless transfer of GOH contribute to the increased capacity of the present system over typical power and free conveyer systems. In addition, costs associated with the purchase and maintenance of trolleys and with the installation of trolley return systems are fully eliminated. Finally, labor costs may be saved since operators of the present system need not engage in the physically demanding work of offloading trolleys and transferring GOH and will likely be exposed to a lower rate of personal injuries. Thus, the trolley-less overhead conveyer system of the present invention accomplishes the movement of GOH through various processing steps in manufacturing, warehousing and distribution facilities in a quick, efficient and cost-effective manner when compared to known power and free conveyer systems.

Figure 1B:
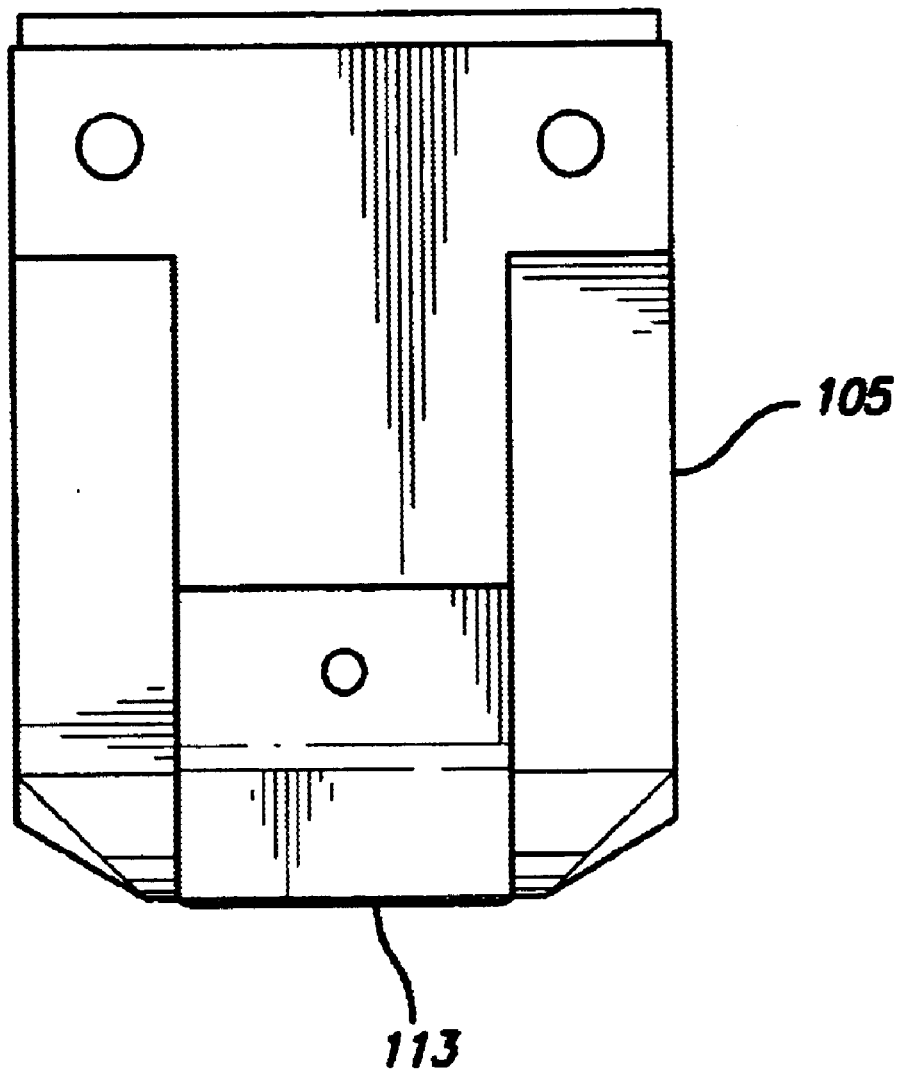

As depicted in FIGS. 1a–b, one aspect of the present invention may be embodied in a pusher dog assembly 101. The pusher dog assembly 101 may include a top end 102 and a bottom end 104, a pusher dog body 103 disposed near the top end 102 and a pusher pad 105 disposed near the bottom end 104. The pusher dog assembly 101 may further include a front end 110 and a back end 112. The pusher dog assembly 101 may further include a mounting strap 107 disposed on the pusher dog body 103, an axle 109 engaged to the pusher dog body 103 by the mounting strap 107, and wheels 111 connected to the axle 109. The pusher dog body 103 may include an upper end 115 and a lower end 117 and a shelf 119 disposed near the upper end 115. The pusher pad 105 may include a metal tip 113, disposed at the bottom end 104 of the pusher dog assembly 101 and an attachment bracket 121, disposed on the pusherpad 105, adjacent to the pusher dog body 103. The pusher pad 105 may be connected to the pusher dog body 103 by a bolt 123 and the mounting strap 107 may be connected to the pusher dog body 103 by screws 125.

The pusher dog assembly 101 may be designed to operate in conjunction with a series of interconnected rails or rail components 131, having a top surface 135 and a bottom surface 137. The pusher dog assembly 101 may also be designed to directly engage hangers and push them along the top surface 135 of the series of interconnected rails or rail components 131.

The pusher dog assembly 101 may also be designed to operate in conjunction with an enclosed track 133, the enclosed track 133 having an inner surface 139, an outer surface 141, a top 140, and a bottom 142, the enclosed track 133 being disposed, in one embodiment, parallel to, and above the series of interconnected rails or rail components 131. The enclosed track 133 may include a central opening 144 in its bottom 142 that may extend along the length of the enclosed track 133. The central opening 144 may be designed to allow the pusher dog assembly 101 to protrude from the enclosed track 133 and extend downward toward the series of interconnected rails or rail components 131. The pusher dog assembly 101 and enclosed track 133 may be configured such that the wheels 111, the axle 109, and parts of the mounting strap 107 and the pusher dog body 103 are housed within the enclosed track 133. The pusher dog assembly 101 and enclosed track 133 may be further configured such that the pusher pad 105, and parts of the mounting strap 107 and pusher dog body 103 protrude from the enclosed track 133.

The pusher dog assembly 101 may be further designed to operate in conjunction with a chain 143, disposed within and running through the enclosed track 133. The axle 109 of the pusher dog assembly 101 may be connected to the chain 143. Thus, movement of the chain 143 may result in the movement of the wheels 111 along the inner surface 139 of the enclosed track 133 and the concurrent movement of the pusher dog assembly 101 along the length of the series of interconnected rails or rail components 131.

The screws 125 that hold the mounting strap 107 to the pusher dog body 103 may be slightly offset. As a result, when the screws 125 and the mounting strap 107 are secured to the pusher dog body 103, the shelf 119 may be held flush against the chain 143. Consistent tension may be maintained on the chain 143 through known methods including, but in no way limited to, the use of spring or air operated take-ups. In turn, the consistent tension on the chain 143 may result in the pusher dog apparatus 101 being held at a constant height above the series of interconnected rails or rail components 131. In particular, the pusher pad 105 of the pusher dog assembly 101 may be maintained at a consistent, desired height above the series of interconnected rails or rail components 131, when the pusher pad 105 is not engaged with hangers. The consistent, desired height may be that which allows the engagement of the pusher pad 105 with a hanger that is suspended on the top surface 135 of the series of interconnected rails or rail components 131.

The pusher pad 105 may be connected by the bolt 123 to the pusher dog body 103 in such a way that the pusher pad 105 may pivot around the axis of its attachment to the pusher dog body 103. As a result, hangers may be transported, manually or mechanically, toward the back end 112 of the pusher dog assembly 101 along the series of interconnected rails or rail components 131 and may pass under the pusher pad 105 by pivoting the pusher pad 105 upward. However, if the pusher dog assembly 101 is moved along the series of interconnected rails or rail components 131 (e.g., by movement of the chain 143) with the front end 110 of the pusher dog assembly 101 leading, and if the pusher dog assembly 101 encounters a hanger, the pusher pad 105 may contact the hanger and may also be pushed against the pusher dog body 103, resulting in the transportation of the hanger along the series of interconnected rails or rail components 131. Upon contact of a hanger by the pusher pad 105, the pusher pad 105 may also be pushed into contact with the series of interconnected rails or rail components 131, thus providing for smooth transportation of the hanger along the series of interconnected rails or rail components 131.

The pusher pad 105 may be constructed of urethane, polyurethane or glass-filled nylon, although one skilled in the art will realize that alternate materials are possible. The use of urethane or polyurethane may result in a relatively flexible pusher pad 105 that may be suitable for pushing hangers on level portions of the series of interconnected rails or rail components 131 or for pushing hangers up portions of the series of interconnected rails or rail components 131 that have an incline of up to 8 degrees. The use of glass-filled nylon may result in a relatively stiff pusher pad 105 that may be suitable for pushing hangers up portions of the series of interconnected rails or rail components 131 that have an incline of between 8 and 15 degrees. The metal tip 113 of the pusher pad 105 may be constructed of stainless steel and may be designed to limit friction between the pusher pad 105 and the series of interconnected rails or rail components 131 when the pusher pad 105 is in contact with a hanger and, thus, is also in contact with the series of interconnected rails or rail components 131. One skilled in the art will realize that alternate materials are possible for the construction of the metal tip 113.

Figure 2A:
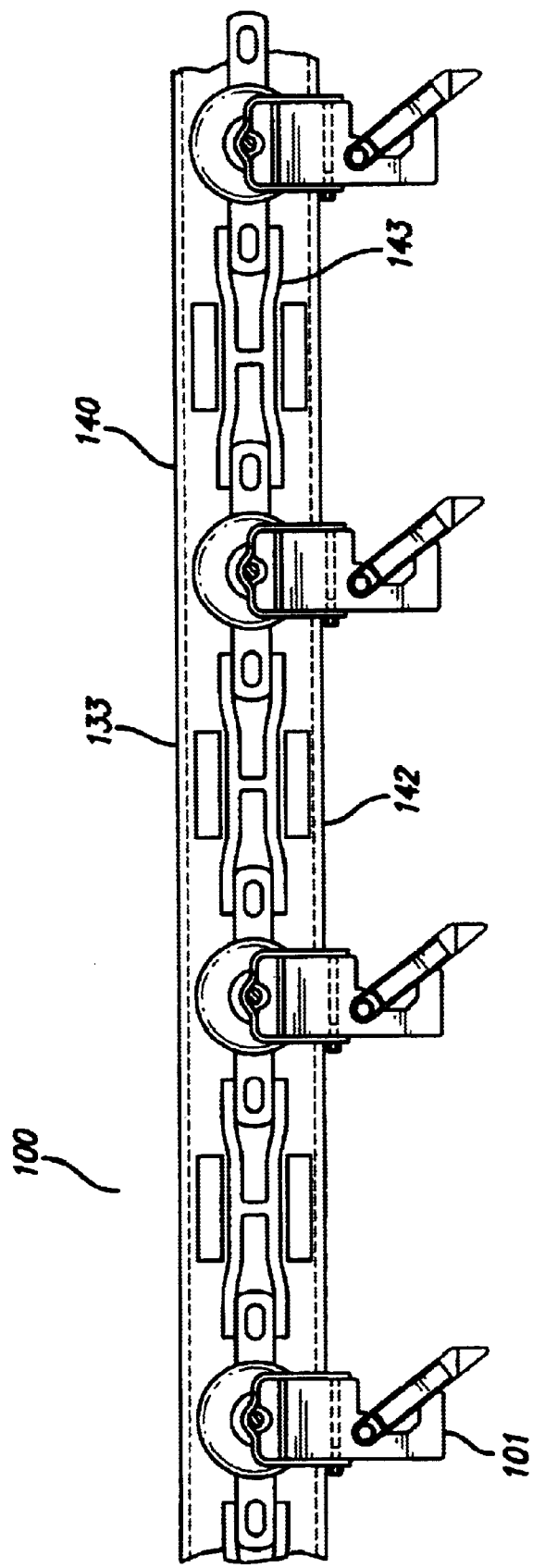
FIGS. 2a–c illustrate a system for transporting products on hangers in accordance with an embodiment of the present invention.
Figure 2B:
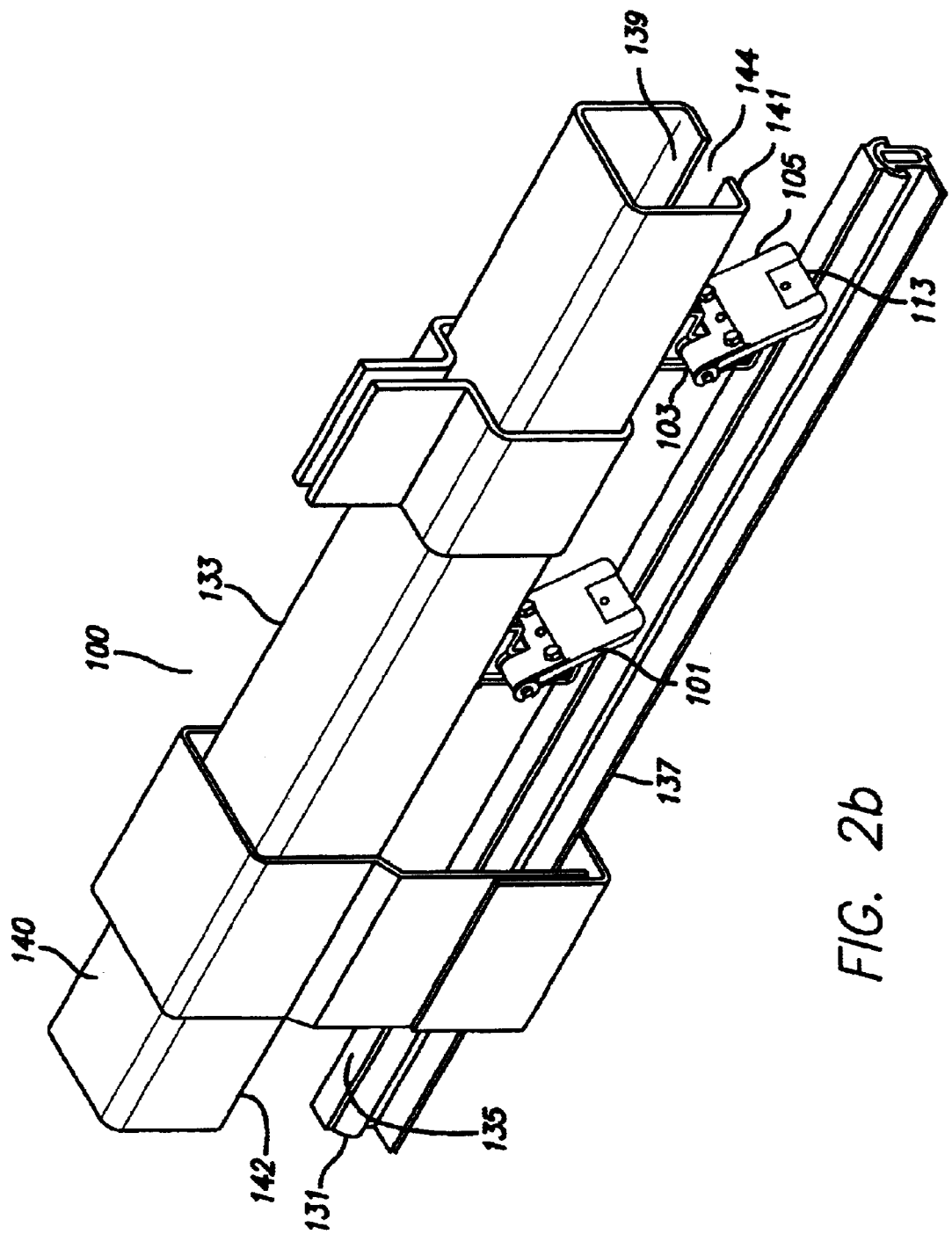
Figure 2C:
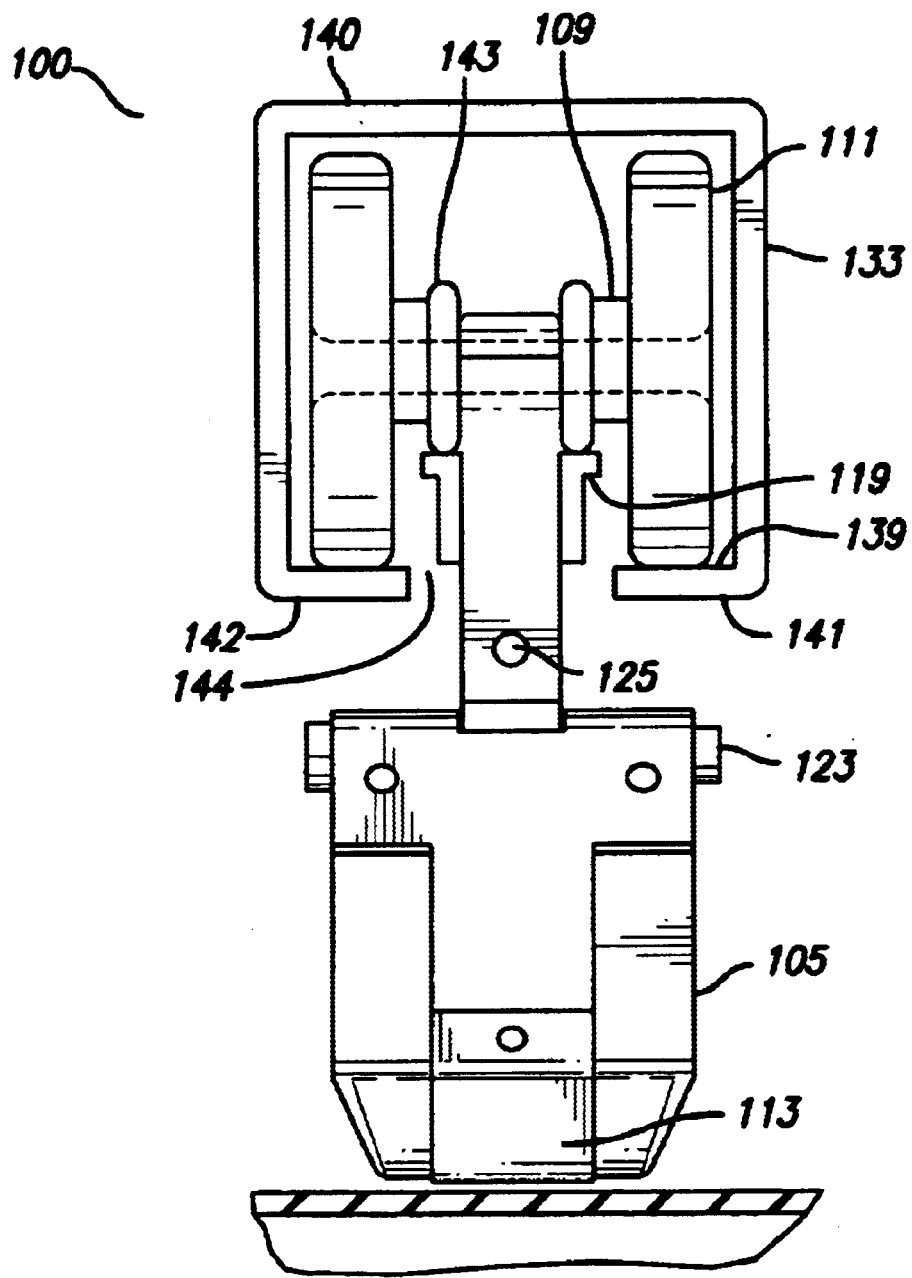

As depicted in FIGS. 2a–c, another aspect of the present invention may be embodied in a system 100 for transporting products on hangers. The system 100 may include a pusher dog assembly 101. The pusher dog assembly 101 may include a top end 102 and a bottom end 104, a pusher dog body 103 disposed near the top end 102 and a pusher pad 105 disposed near the bottom end 104. The pusher dog assembly 101 may further include a front end 110 and a back end 112. The pusher dog assembly 101 may further include a mounting strap 107 disposed on the pusher dog body 103, an axle 109 engaged to the pusher dog body 103 by the mounting strap 107, and wheels 111 connected to the axle 109. The pusher dog body 103 may include an upper end 115 and a lower end 117 and a shelf 119 disposed near the upper end 115. The pusher pad 105 may include a metal tip 113, disposed at the bottom end 104 of the pusher dog assembly 101 and an attachment bracket 121, disposed on the pusher pad 105, adjacent to the pusher dog body 103. The pusher pad 105 may be connected to the pusher dog body 103 by a bolt 123 and the mounting strap 107 may be connected to the pusher dog body 103 by screws 125.

The system 100 for transporting products on hangers may further include a series of interconnected rails or rail components 131, having a top surface 135 and a bottom surface 137. The pusher dog assembly 101 may be designed to directly engage hangers and push them along the top surface 135 of the series of interconnected rails or rail components 131.

The system 100 for transporting products on hangers may further include an enclosed track 133, the enclosed track 133 having an inner surface 139, an outer surface 141, a top 140 and a bottom 142, the enclosed track 133 being disposed parallel to, and above the series of interconnected rails or rail components 131. The enclosed track 133 may include a central opening 144 in its bottom 142 that may extend along the length of the enclosed track 133. The central opening 144 may be designed to allow the pusher dog assembly 101 to protrude from the enclosed track 133 and extend downward toward the series of interconnected rails or rail components 131. The pusher dog assembly 101 and enclosed track 133 may be configured such that the wheels 111, the axle 109, and parts of the mounting strap 107 and the pusher dog body 103 are housed within the enclosed track 133. The pusher dog assembly 101 and enclosed track 133 may be further configured such that the pusher pad 105, and parts of the mounting strap 107 and pusher dog body 103 protrude from the enclosed track 133. The series of interconnected rails or rail components 131 and the enclosed track 133 may be suspended above the floor of a facility by brackets and support members.

The system 100 for transporting products on hangers may further include a chain 143, disposed within and running through the enclosed track 133. The axle 109 of the pusher dog assembly 101 may be connected to the chain 143. Thus, movement of the chain 143 may result in movement of the wheels 111 along the inner surface 139 of the enclosed track 133 and the concurrent movement of the pusher dog assembly 101 along the length of the series of interconnected rails or rail components 131.

The screws 125 that hold the mounting strap 107 to the pusher dog body 103 may be slightly offset. As a result, when the screws 125 and the mounting strap 107 are secured to the pusher dog body 103, the shelf 119 may be held flush against the chain 143. Consistent tension may be maintained on the chain 143 through known methods including, but in no way limited to, the use of spring or air operated take-ups. In turn, the consistent tension on the chain 143 may result in the pusher dog apparatus 101 being held at a constant height above the series of interconnected rails or rail components 131. In particular, the pusher pad 105 of the pusher dog assembly 101 may be maintained at a consistent, desired height above the series of interconnected rails or rail components 131, when the pusher pad 105 is not engaged with hangers. The consistent, desired height may be that which allows the engagement of the pusher pad 105 with a hanger that is suspended from the top surface 135 of the series of interconnected rails or rail components 131.

The pusher pad 105 may be connected by the bolt 123 to the pusher dog body 103 in such a way that the pusher pad 105 may pivot around the axis of its attachment to the pusher dog body 103. As a result, hangers may be transported, manually or mechanically, toward the backend 112 of the pusher dog assembly 101 along the series of interconnected rails or rail components 131 and may pass under the pusher pad 105 by pivoting the pusher pad 105 upward. However, if the pusher dog assembly 101 is moved along the series of interconnected rails or rail components 131 (e.g., by movement of the chain 143) with its front end 110 leading, and if the pusher dog assembly 101 encounters a hanger, the pusher pad 105 may contact the hanger and may also be pushed against the pusher dog body 103, resulting in the transportation of the hanger along the series of interconnected rails or rail components 131. Upon contact of a hanger by the pusher pad 105, the pusher pad 105 may be pushed into contact with the series of interconnected rails or rail components 131, thus providing for smooth transportation of the hanger along the series of interconnected rails or rail components 131.

The pusher pad 105 may be constructed of urethane, polyurethane or glass-filled nylon, although one skilled in the art will realize that alternate materials are possible. The use of urethane or polyurethane may result in a relatively flexible pusher pad 105 that may be suitable for pushing hangers on level portions of the series of interconnected rails or rail components 131 or for pushing hangers up portions of the series of interconnected rails or rail components 131 that have an incline of up to 8 degrees. The use of glass-filled nylon may result in a relatively stiff pusher pad 105 that may be suitable for pushing hangers up portions of the series of interconnected rails or rail components 131 that have an incline of between 8 and 15 degrees. The metal tip 113 of the pusher pad 105 may be constructed of stainless steel and may be designed to limit friction between the pusher pad 105 and the series of interconnected rails or rail components 131 when the pusher pad 105 is in contact with a hanger and, thus, is also in contact with the series of interconnected rails or rail components 131. One skilled in the art will realize that alternate materials are possible for the construction of the metal tip 113.

While the description above refers to particular embodiments of the present invention, it should be readily apparent to people of ordinary skill in the art that a number of modifications may be made without departing from the spirit thereof. The accompanying claims are intended to encompass such modifications as would fall within the true spirit and scope of the invention. The presently disclosed embodiments are, therefore, to be considered in all respects as illustrative and not restrictive. Accordingly, the scope of the invention is indicated by the appended claims rather than the foregoing description. All changes that come within the meaning and range of equivalency of the claims are intended to be embraced therein.

What is claimed is:

1. A pusher dog assembly having a top end, a bottom end, a front end and a back end, comprising:
    a pusher dog body;
    a pusher pad disposed near the bottom end of said pusher dog assembly, the pusher pad being configured to engage hangers and push said hangers along a series of interconnected rails, said pusher pad further having a rail engaging surface configured to reduce friction between the pusher pad and said series of interconnected rails; and
    means for joining the pusher dog assembly to a chain.

2. A system for transporting products on hangers, comprising:
    a series of interconnected rails, having a top surface and a bottom surface;
    an enclosed track having an inner surface and an outer surface, the enclosed track being disposed parallel to, and above, the series of interconnected rails;
    a chain, disposed within and running through the enclosed track; and
    a pusher dog assembly with a top end, a bottom end, a front end and a back end, said pusher dog assembly being engaged to the chain and extending downward from the enclosed track toward the series of interconnected rails, said pusher dog assembly comprising:
        a pusher dog body disposed near the top end;
        a pusher pad disposed near the bottom end, the pusher pad being configured to directly engage hangers and push said hangers along the series of interconnected rails; and
        means for engaging the pusher dog assembly to the chain.

* * * * *